(12) United States Patent
Chan et al.

(10) Patent No.: US 7,082,021 B2
(45) Date of Patent: Jul. 25, 2006

(54) CIRCUIT INTERRUPTER WITH IMPROVED SURGE SUPPRESSION

(75) Inventors: David Y. Chan, Bellerose, NY (US); Eugene Shafir, Jamaica Estates, NY (US)

(73) Assignee: Leviton Manufacturing Co., Ltd., Little Neck, NY (US)

( * ) Notice: Subject to any disclaimer, the term of this patent is extended or adjusted under 35 U.S.C. 154(b) by 0 days.

(21) Appl. No.: 11/079,557

(22) Filed: Mar. 14, 2005

(65) Prior Publication Data

US 2005/0157439 A1   Jul. 21, 2005

Related U.S. Application Data

(63) Continuation of application No. 09/829,339, filed on Apr. 9, 2001, now Pat. No. 6,900,972.

(51) Int. Cl.
*H02H 3/00*   (2006.01)
*H02H 9/08*   (2006.01)

(52) U.S. Cl. .......................... 361/111; 361/42

(58) Field of Classification Search ................ 361/113, 361/111, 42, 93.6
See application file for complete search history.

(56) References Cited

U.S. PATENT DOCUMENTS

| 3,731,154 | A | | 5/1973 | Torosian | |
|---|---|---|---|---|---|
| 4,023,071 | A | * | 5/1977 | Fussell | 361/56 |
| 4,180,841 | A | * | 12/1979 | Engel | 361/45 |
| 4,587,588 | A | * | 5/1986 | Goldstein | 361/54 |
| 4,630,163 | A | * | 12/1986 | Cooper et al. | 361/56 |
| 4,901,183 | A | * | 2/1990 | Lee | 361/56 |
| 5,177,657 | A | * | 1/1993 | Baer et al. | 361/45 |
| 5,418,678 | A | * | 5/1995 | McDonald | 361/46 |
| 5,448,443 | A | * | 9/1995 | Muelleman | 361/111 |
| 5,555,150 | A | * | 9/1996 | Newman, Jr. | 361/56 |
| 5,617,284 | A | * | 4/1997 | Paradise | 361/58 |
| 6,040,967 | A | * | 3/2000 | DiSalvo | 361/42 |

* cited by examiner

*Primary Examiner*—Brian Sircus
*Assistant Examiner*—Zeev Kitov
(74) *Attorney, Agent, or Firm*—Paul J. Sutton

(57) ABSTRACT

A suppression and protection circuit is used in conjunction with a circuit interrupter. In one configuration, a voltage clamping device such as a metal oxide varistor is utilized in a ground fault circuit interrupter product for handling transient surges and overvoltage conditions and is placed in series with a solenoid coil. The suppression and protection circuit includes a crowbar device across the line such as a header spark gap to prevent overvoltages, and a low pass filter such as an LC filter for suppressing transient surges.

5 Claims, 5 Drawing Sheets

CIRCUIT INTERRUPTER WITH IMPROVED SURGE SUPPRESSION

This application is a continuation of application Ser. No. 09/829,339, filed Apr. 9, 2001 now U.S. Pat. No. 6,900,972.

CROSS REFERENCE TO RELATED APPLICATIONS

This application is related to commonly owned application Ser. No. 09/812,288, filed Mar. 20, 2001, entitled Circuit Interrupting Device with Reset Lockout and Reverse Wiring Protection and Method of Manufacture, by inventors Steven Campolo, Nicholas DiSalvo and William R. Ziegler, which is a continuation-in-part of application Ser. No. 09/379,138 filed Aug. 20, 1999, now U.S. Pat. No. 6,246,558, which is a continuation-in-part of application Ser. No. 09/369,759 filed Aug. 6, 1999, now U.S. Pat. No. 6,282,070, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/812,875, filed Mar. 20, 2001, entitled Reset Lockout for Sliding Latch GFCI, by inventors Frantz Germain, Stephen Stewart, David Herzfeld, Steven Campolo, Nicholas DiSalvo and William R. Ziegler, which is a continuation-in-part of application Ser. No. 09/688,481 filed Oct. 16, 2000, all of which are incorporated herein in their entirety by reference.

This application is related to commonly owned application Ser. No. 09/813,683, filed Mar. 21, 2001, now U.S. Pat. No. 6,693,779, entitled IDCI With Reset Lockout and Independent Trip, by inventor Nicholas L. DiSalvo, herein incorporated in its entirety by reference.

This application is related to commonly owned application Ser. No. 09/812,601, filed Mar. 20, 2001, now abandoned, entitled Neutral Switch Test Mechanism for a Circuit Interrupter, by inventors David Y. Chan, James Richter and Gerald N. King, herein incorporated in its entirety by reference.

FIELD OF THE INVENTION

The present invention relates to surge suppression, and in particular to circuit interrupters and ground fault circuit interrupters (GFCI) and related products with enhanced transient suppression and protection characteristics.

BACKGROUND OF THE INVENTION

Known GFCI products typically include a metal oxide varistor (MOV) positioned across the power lines of the GFCI product, with the MOV providing some surge protection to the GFCI product circuitry by clamping transient voltages to acceptable levels.

An MOV is typically a non-linear resistance that is a very high resistance at below the threshold voltage and is typically modeled as an open circuit. At voltages above the threshold voltage, the resistance is nearly zero and transient power is dissipated. The amount of energy that an MOV dissipates is generally related to the size of the device, typically a disc or 14, 20, or 40 mm or the like. A larger MOV typically dissipates more energy, but take up more space, may be more costly and may require more open space around the device.

The nature of the clamping and the amount of energy that may be dissipated is determined by the size of the disc and voltage rating associated with a disc type MOV. Heretofore, GFCI products have typically been limited to handling transient voltages of 6 kV at 100 A. A need exists for GFCI products capable of sustaining greater transient conditions.

In addition, due to deregulation of local power authorities, overvoltage conditions may be more prevalent, requiring circuits to survive, for example, 240 V overvoltage conditions for a 120 V rated product. When such conditions occur, GFCI components such as the MOV in the typical GFCI may not survive. For example, a MOV in the typical GFCI operating beyond its rating at overvoltage may disintegrate, and thus such conditions may also destroy the rest of the electronics in the GFCI product. Furthermore, an MOV may fail by rupturing, exploding or igniting. Such failure conditions are potentially dangerous.

A need exists for a surge protection circuit which allows components such as a MOV to survive power conditions exceed voltage and current ratings, and thus enabling a GFCI product to survive overvoltage conditions.

SUMMARY OF THE INVENTION

A suppression and protection circuit is used in conjunction with a circuit interrupter. In an embodiment, a metal oxide varistor (MOV) is utilized in a ground fault circuit interrupter (GFCI) product for handling transient surges and overvoltage conditions. In an embodiment, the suppression and protection circuit includes a crowbar device across the line such as a header spark gap to prevent overvoltages, and a low pass filter such as an LC filter for suppressing transient surges.

DETAILED DESCRIPTION OF THE PREFERRED EMBODIMENTS

A circuit interrupted having improved transient and overvoltage suppression is described. The commonly owned U.S. patent applications referred to above describe circuit interrupting devices and are incorporated herein in their entirety by reference. For example, U.S. application Ser. No. 09/812,288 describes a circuit interrupting device having a reset mechanism with a reset lockout portion. The reset lockout portion prevents the reestablishing of electrical continuity in open conductive paths if the circuit interrupting portion is non-operational, if an open neutral condition exists or if the device is reverse wired. Furthermore, a GFCI is described in commonly owned U.S. Pat. No. 4,595,894 which is incorporated herein by reference in its entirety.

Figure 1:
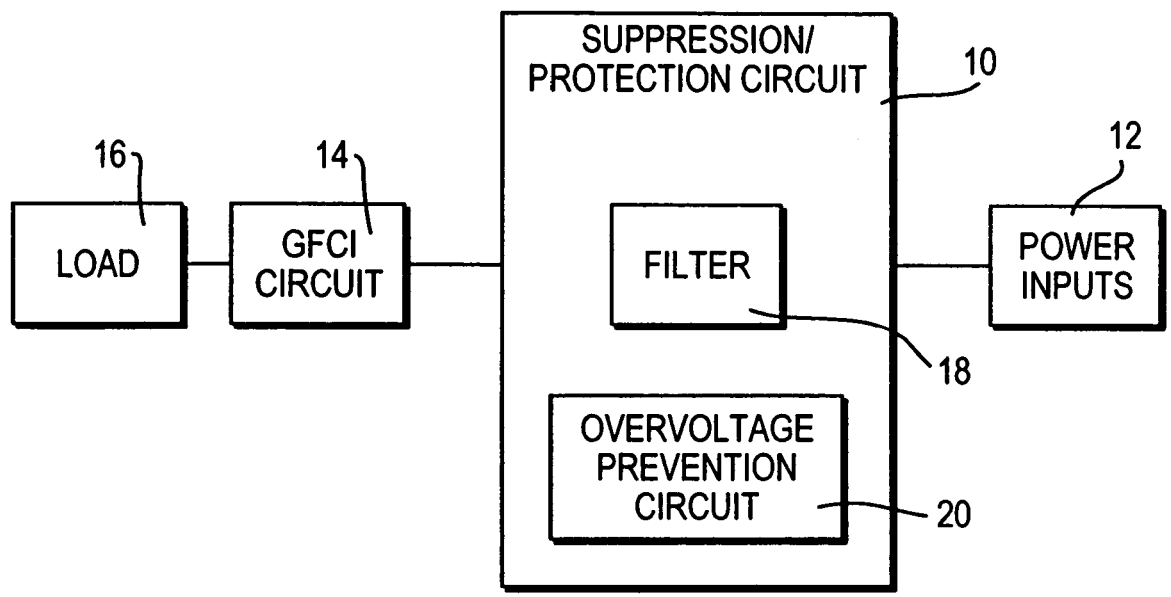
FIG. 1 illustrates a block diagram of a disclosed suppression and protection circuit connected between power inputs and the GFCI circuit according to an embodiment of the present invention.

Referring to FIG. 1, the suppression and protection circuit 10 is shown to interface between power inputs 12 and a ground fault circuit interrupter (GFCI) circuit 14 and/or related products connected to a load 16, with the suppression and protection circuit 10 providing enhanced suppression of transient surges as well as protection from overvoltage conditions. The circuit 10 includes a filter circuit 18 and a overvoltage prevention component 20, which are described in greater detail with reference to FIG. 2.

Figure 2:
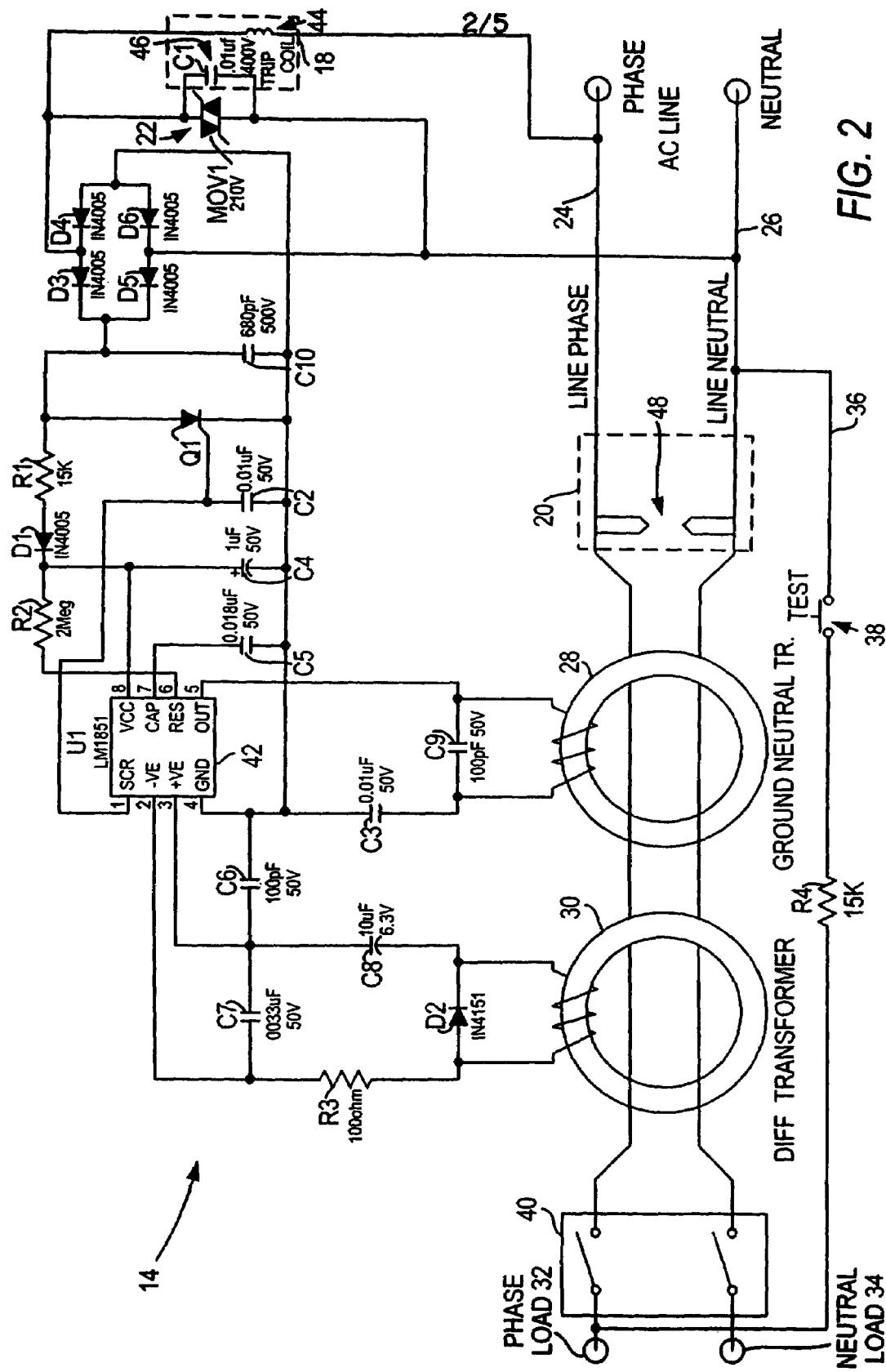
FIG. 2 illustrates the circuits and components in FIG. 1 in an example embodiment with greater detail.

FIG. 2 illustrates one example embodiment of the circuit 10 and the GFCI 14. The GFCI 14 includes a metal oxide varistor (MOV) 22 positioned between input power lines as the power inputs 12, for example, an alternating current (AC) line connection having a phase line 24 and a neutral line 26. The lines 24, 26 are connected through the overvoltage prevention circuit 20, which in an example embodiment is a spark gap device known in the art, and through a ground neutral transformer 28 and a differential or sensing transformer 30 to the load 16, which may include a phase load connection 32 and the neutral load connection 34, as in FIG. 2. A test line 36 may also be provided in a manner known in the art including, for example, a test switch 38 and a resistor R4 having a 15 KΩ resistance. Optionally, a relay 40 and/or circuit breaker known in the art may be provided, as further described herein, connecting the differential transformer 30 to the load lines 32–34.

A processor 42 of the GFCI 14 is connected via a plurality of pins or connectors to the transformers 28, 30 in a manner known in the art, for example, using capacitors C3 and C6–C9, a resistor R4, and a diode D2. In the example embodiment shown in FIG. 2, the resistor R3 has a 100 Ω resistance, and the capacitors C3 and C6–C9 have capacitances of 0.01 µF, 100 pF, 0.0033 µF, 10 µF, and 100 pF, respectively, each having a voltage rating of 50 V, except for the capacitor C8 having a voltage rating of 6.3 V.

The processor 42 may be, for example, a model LM1851 ground fault interrupter controller commercially available from "NATIONAL SEMICONDUCTOR", capable of providing ground fault protection for AC power outlets in consumer and industrial environments. The processor 42 is also connected via its pins/connectors to the MOV 22 in a manner known in the art, for example, using capacitors C2 and C4–C5 having capacitances of 0.01 µF, 1 µF, and 0.018 µF, respectively, at 50 V; a capacitor C10 having a 680 pF capacitance at 500 V; resistors R1 and R2 having 15 kΩ and 2 MΩ resistances, respectively; a diode D1; a rectifier Q1 such as a silicon controlled rectifier (SCR); and a set of diodes D3–D6 forming a bridge circuit or configuration, as shown in FIG. 2.

The MOV 22 as well as the filter circuit 18 are connected to the set of diodes D3–D6. In an example embodiment, the filter circuit 18 includes an inductor 44 and a capacitor 46, labeled C1 in FIG. 2 and having a capacitance of, for example, 0.01 µF at 400 V. In this example, the filter circuit 18 functions as an LC low pass filter for input power applied to the MOV 22.

The inductor 44 may be a solenoid bobbin acting as a trip coil, such that the inductor 44 also functions as an actuator to disengage the relay mechanism 40 on the load side. The capacitor C1 46 may be normally present in the GFCI product 14 as a by-pass capacitor. In the disclosed circuit 10, the capacitor C1 46 serves as a by-pass capacitor as well as the capacitance in the LC filter of the filter circuit 18.

In the embodiment shown in FIG. 2, the MOV 22 clamps the voltage exposed to the capacitor C1 46 to be within the voltage rating of the capacitor 46, for example, 400 V. In one example, transient voltage surges of 3 kV or higher are thus clamped down to 400 V or less. As in the prior art, the MOV 22 itself in a GFCI product 14 is capable of handling transient surges and overvoltage conditions of, for example, less than 3 kV at 3 kA such as a 100 A surge. Using the LC low pass filter 18 in the disclosed suppression and protection circuit 10, transient voltages exceeding, for example, 3 kV at 3 kA and even 6 kV at 3 kA, are suppressed. Accordingly, the MOV 22 in the GFCI product 14 is capable of handing voltages exceeding a root-mean-square (RMS) voltage rating of the MOV 22, permitting the MOV 22 to survive and provide protection from other transient, surge, and overvoltage conditions, as described herein. Test transients are often configured with standard pulse ramp up and duration time waveforms.

Continuing with FIG. 2, in another embodiment for providing overvoltage protection, the overvoltage prevention circuit 20 includes the spark gap 48 which generates arcs across its terminals to perform a breakover at transients exceeding a predetermined voltage, such as 3 kV, and further provides multi-mode surge protection and transient suppression. When breakover occurs, the resulting voltage to the transformer 28 is approximately 200 V. In addition, the filter 18 also functions to limit the current to which the MOV 22 is exposed during an overvoltage surge condition. Accordingly, when the current in the MOV 22 is thus limited, the exposure of the MOV 22 to RMS voltages beyond the RMS voltage rating of the MOV 22 does not damage the MOV 22, and further, does not damage the rest of the GFCI circuit 14.

In this manner, existing components are combined with other known components to be used as a low pass filter 18 and to cooperate and function with a spark gap device 48 to significantly improve surge suppression and overvoltage protection.

Figure 3:
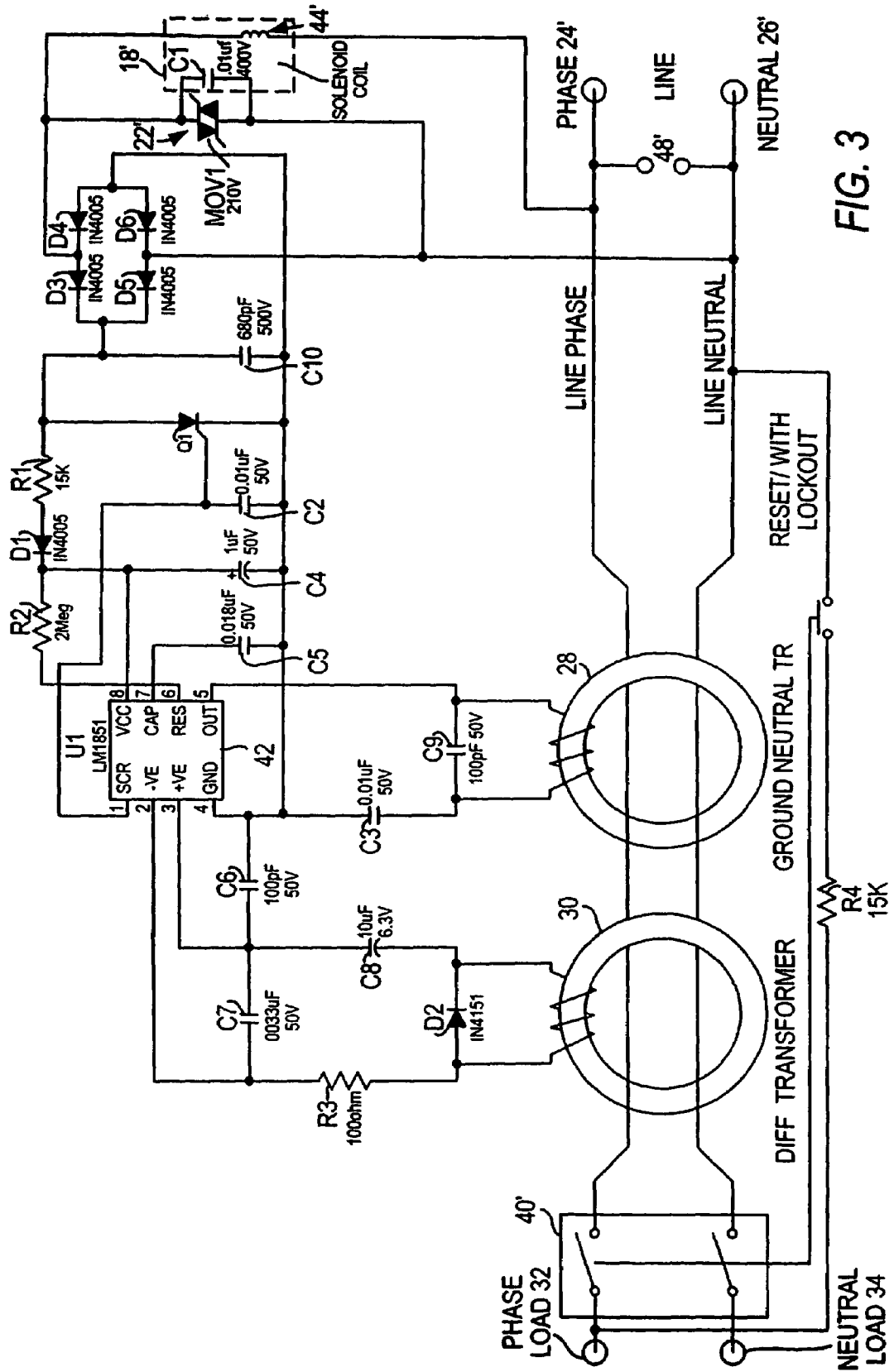
FIG. 3 illustrates a schematic diagram of a GFCI circuit having a suppression and protection circuit and a grounded neutral reset lockout test according to an embodiment of the present invention.
Figure 4:
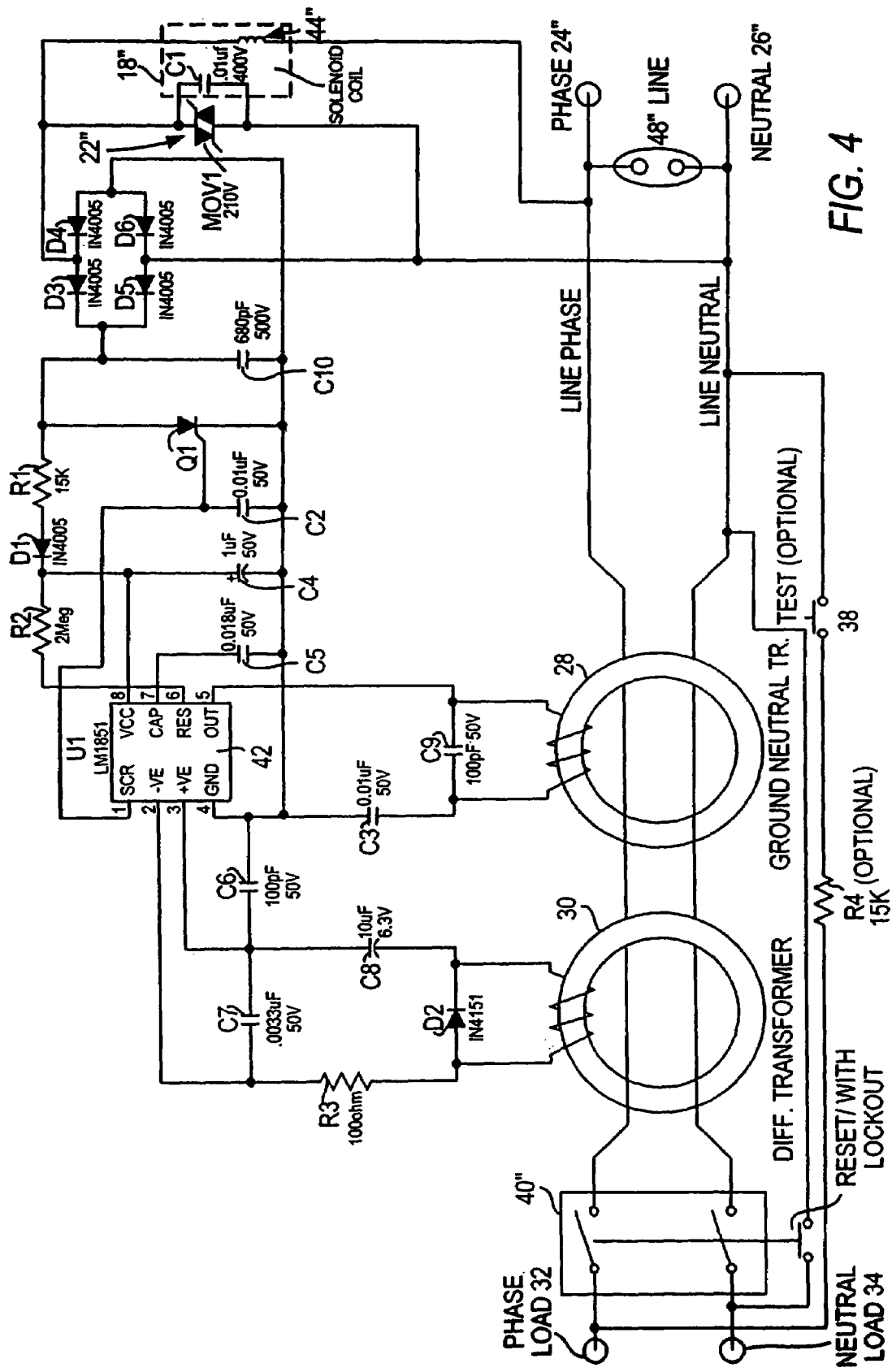
FIG. 4 illustrates a schematic diagram of an alternative embodiment of the GFCI circuit of FIG. 3, utilizing a gas tube crowbar device.

Referring to FIGS. 3 and 4, embodiments of the present invention are described. In FIG. 3, as in the above embodiment, an LC low pass filter is utilized 44'. The MOV 22' is a variable resistance that may have an effect as voltage changes. Similarly a crowbar device 48' is utilized.

In FIG. 4, as in the above embodiment, an LC low pass filter is utilized 44". The MOV 22" is a variable resistance that may have an effect as voltage changes. Similarly a gas tube crowbar device 48" is utilized.

As can be appreciated, a high frequency transient can be attenuated by a series low pass filter. Additionally, a transient may be diverted by absorbing it in a device capable of absorbing energy or shunting it away from a sensate load.

Voltage clamping devices include without limitation selenium cells, Zener diodes, silicon carbide varistors and metal oxide varistors MOVs. An MOV has a generally fast response time and are commonly used for transient suppression. An MOV will hold a line voltage down while a disproportionately high current flows through it. Source impedance may be relied upon for clamping.

There is uncertainty as to the long term effects on an MOV that is exposed to repeated transient surges and whether there are "aging" effects. While an MOV may or may not continuously degrade as it is exposed to transient voltages, reducing the energy level to the MOV will increase the likelihood that a transient may be suppressed and downstream devices protected.

MOV devices may theoretically be utilized in parallel to absorb more energy. However such devices may have to be closely matched so that they would each be turned on by a transient at nearly the same time. Of course, if one MOV turned on first, it would absorb the full transient. Further, the use of two devices would require greater space and spacing. Such a configuration would also be more costly.

Accordingly a GFCI according to an embodiment of the present invention will reduce energy delivered to the MOV.

Crowbar devices may be utilized as a transient suppressor to divert transients and protect against overvoltage conditions. Such a device will typically short a transient to the return. Crowbar device can include, without limitation, spark gaps, gas tubes and carbon-block protectors. Generally the gas (air for a header spark gap) must avalanche before the crowbar effect is initiated. Accordingly, a 0.10" space header may have too large a gap to provide avalanche in air at an acceptable voltage level for use as a surge suppressor on an AC power line. Accordingly, a more narrow spark gap may be selected.

For example, an over 3000 volt transient may break down across a spark gap and the rest of the circuit will be exposed to an approximately 200V resulting voltage that an MOV may safely suppress. Similarly in an overvoltage condition of 240V, a low pass filter will limit the current that the MOV is exposed to allowing the MOV to survive beyond its rating.

Figure 5A:
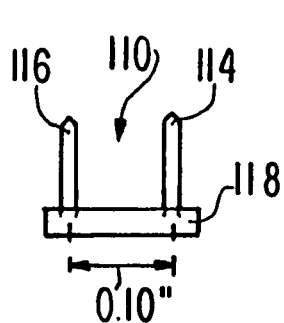
FIG. 5a illustrates a spark gap device having a spark gap with a 0.10 inch width.
Figure 5B:
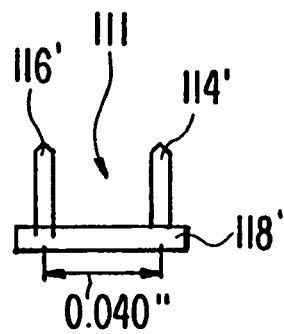
FIG. 5b illustrates a spark gap device having a spark gap with a 0.40 inch width.
Figure 5C:
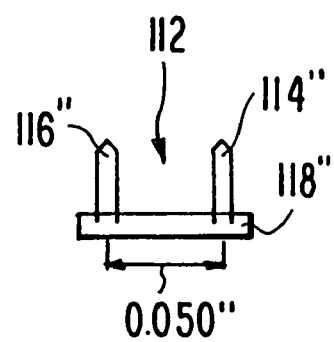
FIG. 5c illustrates a spark gap device having a spark gap with a 0.05 inch width.

Referring to FIGS. 5a–5c, various spark gap configurations are shown having differing spark gap widths. As can be appreciated, varying suppression effects may be had with the differing gaps of devices 110, 111 and 112. At header pins 114 and 116 at sufficiently high voltages, the air or gas in between the header pins will become ionized and a plasma will develop that will dissipate energy and crowbar the transient voltage to a lower value. As can be appreciated, the base 118 should withstand the spark energy. The arc or forward drop during the discharge is low such that the device can carry current to a return path without a relatively large power dissipation in the device.

Figure 5D:
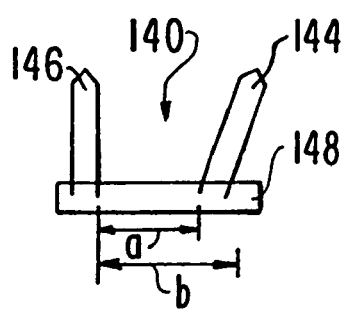
FIG. 5d illustrates a spark gap device with a vertical header pin and an angularly oriented header pin.
Figure 5E:
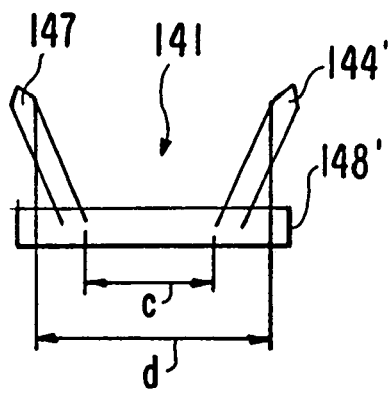
FIG. 5e illustrates a spark gap device with two angularly oriented header pins.

Referring to FIGS. 5d–5e, configurations of a spark gap utilizing a device and related phenomena referred to as a Jacob's ladder are described 140, 141. As can be appreciated, having one or two of the header pins 144, 146, 147 at an angle produce a varying spark gap increasing in the vertical direction that will have a varying suppression effect as the spark "walks" up the gap. As can be appreciated, the base 148 should withstand the spark energy.

As can be appreciated, humidity may effect the performance of a spark gap. Accordingly, measures to avoid humid air such as encapsulating the spark gap may be utilized.

Figure 6A:
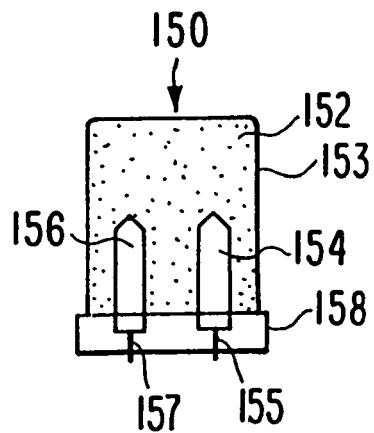
FIG. 6a illustrates a gas tube device having a spark gap formed by two vertical header pins.
Figure 6B:
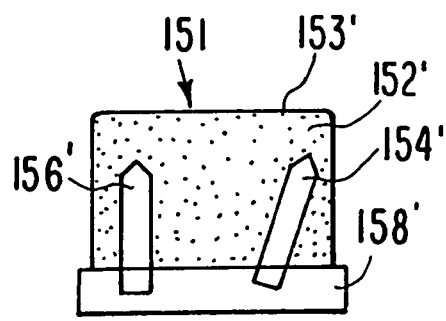
FIG. 6b illustrates a gas tube device having a spark gap formed by a vertical header pin and an angularly oriented header pin.

Referring to FIGS. 6a–6b, various gas tube configurations are shown having differing spark gap widths and may be used as device 48". As can be appreciated, varying suppression effects may be had with the differing gaps of devices 150 and 151. At header pins 154 and 156 at sufficiently high voltages, the air or gas in between the header pins will become ionized and a plasma will develop that will dissipate energy and crowbar the transient voltage to a lower value. As can be appreciated, the base 158 should withstand the spark energy.

As can be appreciated, the gas 152 may be contained by tube 153. Connectors 155 and 157 provide connections. Other suitable materials 152 may be utilized in the spark gap.

Figure 7A:
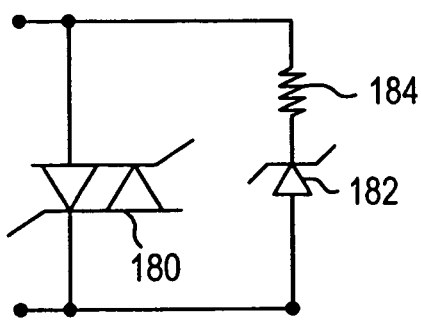
FIG. 7a illustrates a hybrid protection circuit for an MOV, having a low pass filter using a Zener diode and a resistor.
Figure 7B:
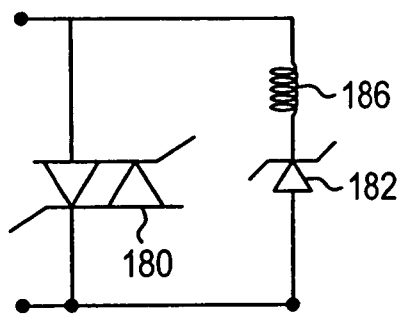
FIG. 7b illustrates a hybrid protection circuit for an MOV, having a low pass filter using a Zener diode and an inductor.

Referring to FIGS. 7a and 7b, a hybrid protection circuit may protect the MOV. The voltage clamp device MOV 180 may be in parallel with a low pass filter or another voltage clamping device such as a Zener diode 182 and a resistor 184 or inductor 186.

Additionally, it is known in the art to provide a visual indication that a device equipped with surge suppression is still operating with surge suppression capability. In an embodiment of the present invention, a visual indicator is provided to indicate that the device is operating with adequate surge suppression capability. Similarly, an alarm such as an audio indicator may be provided to indicate that the device is no longer operating with adequate surge suppression capabilities.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed is:

1. A ground fault circuit interrupter (GFCI) comprising:

a housing;

at least one input conductor disposed at least partially within said housing and capable of being electrically connected to a source of electricity;

at least one output conductor disposed within said housing and capable of conducting electrical current to a load when electrically connected to said at least one input conductor;

a circuit interrupter disposed within said housing and configured to break said electrical connection between said input and output conductors in response to the occurrence of a ground fault or test cycle;

a reset mechanism having a reset lock-out responsive to the activation of said circuit interrupter so as to be movable between a lock-out position wherein said reset lock-out inhibits resetting of said electrical connection between said input and output conductors and a reset position wherein said reset lock-out does not inhibit resetting of said electrical connection between said input and output conductors, wherein when said reset mechanism is activated said circuit interrupter is activated to facilitate movement of said reset lock-out from said lock-out position to said reset position by said reset mechanism and resets said electrical connection between said input and output conductors; and a first mode of surge protection for protecting the GFCI during an over voltage condition comprising a capacitor coupled in series with a solenoid coil of the GFCI to provide a low pass filter connected across the phase and neutral conductors of the GFCI to pass low frequency voltage signals to the GFCI circuit while blocking high frequency signals.

2. The ground fault circuit interrupter of claim 1 having a second mode of surge protection comprising:
a surge protector coupled in parallel with the capacitor of the low pass filter.

3. The ground fault circuit interrupter of claim 2 wherein the surge protector coupled in parallel with the capacitor comprises a metal oxide varistor to shunt a moderate over voltage around the capacitor.

4. The ground fault circuit interrupter of claim 3 having a third mode of surge protection comprising:

an over voltage prevention circuit coupled between the phase and neutral conductors of the GFCI to shunt a severe over voltage between the phase and neutral conductors.

5. The ground fault circuit interrupter of claim 4 wherein the over voltage prevention circuit comprises a spark gap device coupled between the phase and neutral conductors.

* * * * *